United States Patent
Williams et al.

(10) Patent No.: US 10,298,489 B2
(45) Date of Patent: May 21, 2019

(54) ADDING MULTI-TENANT AWARENESS TO A NETWORK PACKET PROCESSING DEVICE ON A SOFTWARE DEFINED NETWORK (SDN)

(71) Applicant: International Business Machines Corporation, Armonk, NY (US)

(72) Inventors: Ronald Becker Williams, Austin, TX (US); Cheng-Ta Lee, Taipei (TW); Lun-Pin Yuan, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 14/808,704

(22) Filed: Jul. 24, 2015

(65) Prior Publication Data

US 2017/0026283 A1    Jan. 26, 2017

(51) Int. Cl.
*H04L 12/715* (2013.01)
*H04L 12/751* (2013.01)
*H04L 12/717* (2013.01)
*H04L 12/713* (2013.01)
*H04L 12/741* (2013.01)
*H04L 29/12* (2006.01)
*H04L 12/24* (2006.01)

(52) U.S. Cl.
CPC .......... *H04L 45/64* (2013.01); *H04L 41/0803* (2013.01); *H04L 45/02* (2013.01); *H04L 45/42* (2013.01); *H04L 45/586* (2013.01); *H04L 45/74* (2013.01); *H04L 61/2507* (2013.01); *H04L 61/2517* (2013.01); *H04L 61/2596* (2013.01)

(58) Field of Classification Search
CPC .... H04L 45/64; H04L 1/0803; H04L 41/0803
See application file for complete search history.

(56) References Cited

U.S. PATENT DOCUMENTS

| | | | |
|---|---|---|---|
| 8,259,571 B1 | 9/2012 | Raphel et al. | |
| 8,356,274 B2 | 1/2013 | Kwok et al. | |
| 2004/0071149 A1* | 4/2004 | Kim | H04L 29/12367 370/401 |
| 2005/0135359 A1* | 6/2005 | Chang | H04L 29/12009 370/389 |
| 2013/0058346 A1 | 3/2013 | Sridharan et al. | |
| 2013/0081109 A1 | 3/2013 | Venkataraman et al. | |

(Continued)

*Primary Examiner* — Zhensheng Zhang
(74) *Attorney, Agent, or Firm* — Jeffrey S. LaBaw; David H. Judson

(57) ABSTRACT

"Multi-tenant awareness" is added to a set of one or more packet processing devices in a Software Defined Network (SDN) having a controller. For each of one or more tenants, information in a table associates network protocol address attributes with an Internet Protocol (IP) address unique to the tenant. The table is associated with a multiple-layer translation layer being managed by the SDN controller. As a data packet traverses the translation layer, network protocol address attributes are translated according to values in the table to enable logical routing of the packet (to a given PPD). This translation occurs dynamically (or "on-the-fly") as packets are "on route" to their destination. By implementing a multi-layer network address translation (NAT), one layer may be used to translate network protocol address source attributes, while a second layer may be used to translate network protocol address destination attributes.

20 Claims, 8 Drawing Sheets

EXAMPLE OF RULE TABLE OF NAT SWITCH 1

| PRIORITY | TYPE | MATCH | ACTION | |
|---|---|---|---|---|
| 6 | SRC-IP | IN-PORT=previous_hop, NW-SRC=10.0.0.1 | SetNwSrc(192.168.122.101) OUTPUT(next_hop) | 902 |
| 6 | SRC-MAC | IN-PORT=previous_hop, DL-SRC=70:f3:95:06:17:4f | SetDlSrc(00:01:95:06...) OUTPUT(next_hop) | 902 |
| 6 | SRC-VLAN | IN-PORT=previous_hop, VLAN-ID=1 | ModVlanId(10) OUTPUT(next_hop) | |
| 6 | SRC-PORT | IN-PORT=previous_hop, TP_SRC=80 (HTTP) | SetTpSrc(8080) OUTPUT(next_hop) | |
| 5 | HYBRID | IN-PORT=previous_hop, NW-SRC=10.0.0.2, TP_SRC=8080, DL-SRC=70:f3:95:06:16:2d, VLAN-ID=1 | SetNwSrc(192.168.122.102) SetTpSrc(21451), ... OUTPUT(next_hop) | |
| 4 | REVERSE-SRC-IP | IN-PORT=next_hop, NW-SRC=192.168.122.101 | SetNwSrc(10.0.0.1) OUTPUT(previous_hop) | |
| 4 | RESERVE-SRC-MAC | IN-PORT=next_hop, DL-SRC=00:01:f3:95:06:17:4f | SetDlSrc(70:f3:95:06:...) OUTPUT(previous_hop) | |
| 4 | RESERVE-SRC-VLAN | IN-PORT=next_hop, VLAN-ID=10 | ModVlanId(1) OUTPUT(previous_hop) | |
| 4 | RESERVE-SRC-PORT | IN-PORT=next_hop, TP_SRC=8080 | SetTpSrc(80) OUTPUT(previous_hop) | |
| 3 | REVERSE-HYBRID | IN-PORT=next_hop, NW_SRC=192.168.122.102, TP-SRC=21451 | SetNwSrc(10.0.0.2) SetTpSrc(8080), ... OUTPUT(previous_hop) | |
| 2 | MISS | * | DROP | |

900 904 904

(56) References Cited

U.S. PATENT DOCUMENTS

| | | |
|---|---|---|
| 2013/0103834 A1 | 4/2013 | Dzerve et al. |
| 2014/0215465 A1 | 7/2014 | Elzur |
| 2015/0244617 A1* | 8/2015 | Nakil ................. G06F 9/45558 709/224 |
| 2016/0330117 A1* | 11/2016 | Thirumurthi ........... H04L 45/66 |

* cited by examiner

EXAMPLE OF RULE TABLE OF NAT SWITCH 1

| PRIORITY | TYPE | MATCH | ACTION |
|---|---|---|---|
| 6 | SRC-IP | IN-PORT=previous_hop, NW-SRC=10.0.0.1 | SetNwSrc(192.168.122.101) OUTPUT(next_hop) |
| 6 | SRC-MAC | IN-PORT=previous_hop, DL-SRC=70:f3:95:06:17:4f | SetDlSrc(00:01:f3:95:06:...) OUTPUT(next_hop) |
| 6 | SRC-VLAN | IN-PORT=previous_hop, VLAN-ID=1 | ModVlanId(10) OUTPUT(next_hop) |
| 6 | SRC-PORT | IN-PORT=previous_hop, TP_SRC=80 (HTTP) | SetTpSrc(8080) OUTPUT(next_hop) |
| 5 | HYBRID | IN-PORT=previous_hop, NW-SRC=10.0.0.2, TP_SRC=8080, DL-SRC=70:f3:95:06:16:2d, VLAN-ID=1 | SetNwSrc(192.168.122.102) SetTpSrc(21451), ... OUTPUT(next_hop) |
| 4 | REVERSE-SRC-IP | IN-PORT=next_hop, NW-SRC=192.168.122.101 | SetNwSrc(10.0.0.1) OUTPUT(previous_hop) |
| 4 | RESERVE-SRC-MAC | IN-PORT=next_hop, DL-SRC=00:01:f3:95:06:17:4f | SetDlSrc(70:f3:95:06:...) OUTPUT(previous_hop) |
| 4 | RESERVE-SRC-VLAN | IN-PORT=next_hop, VLAN-ID=10 | ModVlanId(1) OUTPUT(previous_hop) |
| 4 | RESERVE-SRC-PORT | IN-PORT=next_hop, TP_SRC=8080 | SetTpSrc(80) OUTPUT(previous_hop) |
| 3 | REVERSE-HYBRID | IN-PORT=next_hop, NW_SRC=192.168.122.102, TP-SRC=21451 | SetNwSrc(10.0.0.2) SetTpSrc(8080), ... OUTPUT(previous_hop) |
| 2 | MISS | * | DROP |

FIG. 9

ADDING MULTI-TENANT AWARENESS TO A NETWORK PACKET PROCESSING DEVICE ON A SOFTWARE DEFINED NETWORK (SDN)

BACKGROUND OF THE INVENTION

Technical Field

This disclosure relates generally to protecting resources in a multi-tenant networking environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Software Defined Networking (SDN) is a new network paradigm that separates each network service from its point of attachment to the network, creating a far more dynamic, flexible, automated, and manageable architecture. Using this approach, administrators can easily move virtual resources throughout the network, create private virtual networks that meet specific performance and security needs, and use a host of other high-value applications. SDN abstracts flow control from individual devices to the network level. Similar to server virtualization, where virtual machines are de-coupled from the physical server, network-wide virtualization gives administrators the power to define network flows that meet the connectivity requirements of end stations and to address the specific needs of discrete user communities. SDN pulls the intelligence away from the hardware while still implementing rich feature sets. SDN uses a modular approach that is structured and layered to provide the same functions as a traditional network device, yet in a centralized and highly-available fashion.

SDNs address the administration requirements of large scale networks, both physical and virtual. Using an SDN, service providers that deliver network capability to multiple clients are able to manage their policy and event data distinctly and separately. This multi-tenant capability is an important value proposition to service providers and tenants alike.

Under the covers of a cloud deployment is the cloud provider's infrastructure comprised of networking, hypervisors, and services required to enable individual instances to operate on behalf of the provider's customers. A cloud user (consumer) sees a typical computing environment having processors, memory, and networking. Their environment is distinct from other "cloud instances," and from their perspective isolated except via the network connectivity to which their services have access. In such an environment, and from the perspective of two different cloud consumers (or "tenants"), devices distinct to their particular environments could have precisely the same attributes, i.e. MAC and IP addresses, netmask, and VLAN tags. From each of their perspectives, they would have their own unique addressing. Further, a single tenant might have multiple or "cloned" virtual environments, each with the same "local" attributes. The network "overlay:" is one technology that supports this kind of model. It does so by encapsulating the network traffic from a particular cloud instance, in that encapsulating layer disambiguating (in that encapsulating layer) what are otherwise duplicated addresses residing in two (or more) cloud instances. The result is that the network settings in each tenant are independent and isolated from the others.

When network services like firewalls, intrusion detection and protection, or forensic services want to address such multi-tenant environments, they need a mechanism to distinguish the network traffic between each tenant. For instance, two tenants could send the identical packets to one of the network services mentioned above. A Packet Processing Module (PPM) or device (PPD) representing that service must identify which tenant, in addition to the core network attributes (like MAC and IP addresses) sent the packet. This is necessary to enable the PPD to attribute the packet to a particular tenant and to distinguish distinguish it from others. The technique of network overlay, which involves encapsulating network traffic in an additional layer, is one solution to this otherwise ambiguous network traffic. As described above an overlay encapsulates the original packet in an additional layer, the overlay packet, which can add an additional information about the original, e.g., the tenant, group, or cloud instance to which it is associated. Overlays of this type are based on protocols that encapsulate or "tunnel" traffic. An "overlay aware" PPM is a process that processes both the core and tunneled traffic, and that consumes the metadata of the encapsulating protocol to determine to which tenant or tenants the encapsulated traffic is associated.

Network overlays introduce several challenges, each of which represent a potentially negative performance impact. The overlay protocol is both visible and must be handled by a PPM in addition to handling the encapsulated traffic. Second, because an overlay wraps or encapsulates another packet protocol, it necessarily introduces processing latency, insofar as at the network, or lowest layer of the network stack, the overlay protocol must be processed and the encapsulated packets must be processed.

BRIEF SUMMARY

A method to add "multi-tenant awareness" to a set of one or more packet processing devices (or modules or units) in a multi-tenant Software Defined Network (SDN) having a controller is provided. According to this approach, a particular data set (e.g., a database table) is maintained having the following property: for each of one or more given tenants, information in the table associates one or more network protocol address attributes with an Internet Protocol (IP) address unique to the given tenant. The one or more network protocol address attributes are any networking attribute of any networking protocol that includes source and destination address parameters. The data set is associated with a translation layer being managed by the SDN controller. Preferably, the translation layer includes multiple layers. As a data packet traverses the translation layer, one or more network protocol address attributes are translated according to values in the data set to enable logical routing of the packet (by the translation layer) to a given packet processing device. This translation occurs dynamically (or, "on-the-fly") as packets are "on route" to their destination (typically, a packet processing device), but the approach is also used as a data packet intended for some other packet processing device exits the given packet processing device (PPD). By implementing a multi-layer network address translation (NAT), one layer may be used to translate network protocol address source attributes, while a second layer may be used to translate network protocol address destination attributes. A preferred approach then is to use a multi-layer NAT switch that is managed by the SDN controller under the control of an SDN plug-in leveraging the data set.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 9 is a rule table that is implemented in the NAT switch in FIG. 8 to facilitate the technique of this disclosure.

DETAILED DESCRIPTION OF AN
ILLUSTRATIVE EMBODIMENT

Figure 1:
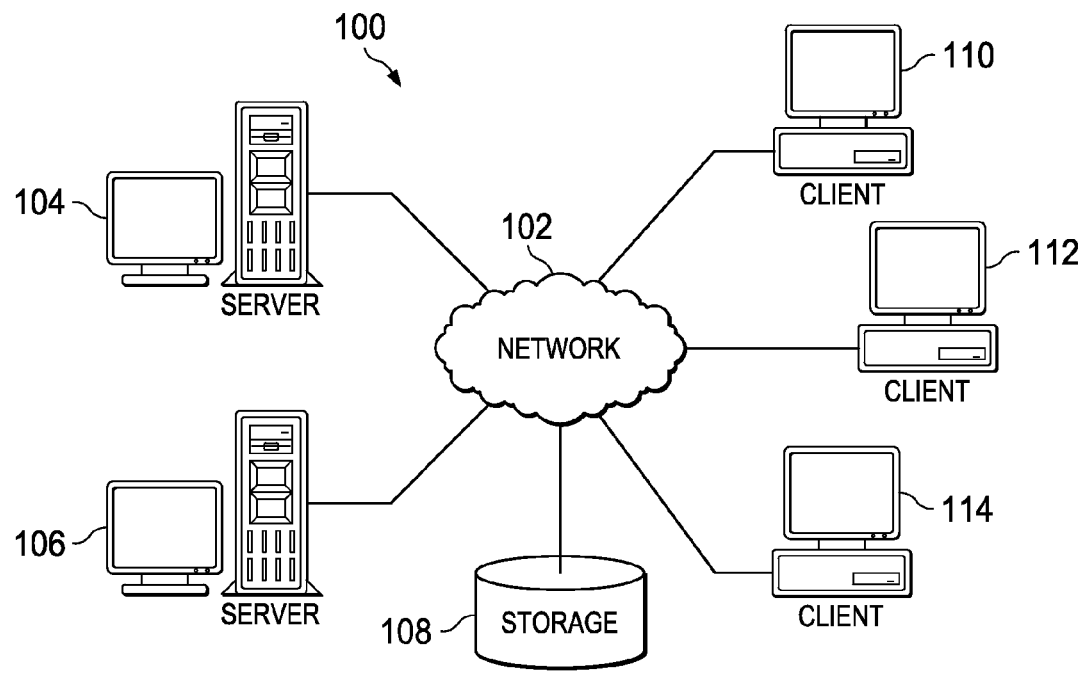
FIG. 1 depicts an exemplary block diagram of a distributed data processing environment in which exemplary aspects of the illustrative embodiments may be implemented.
Figure 2:
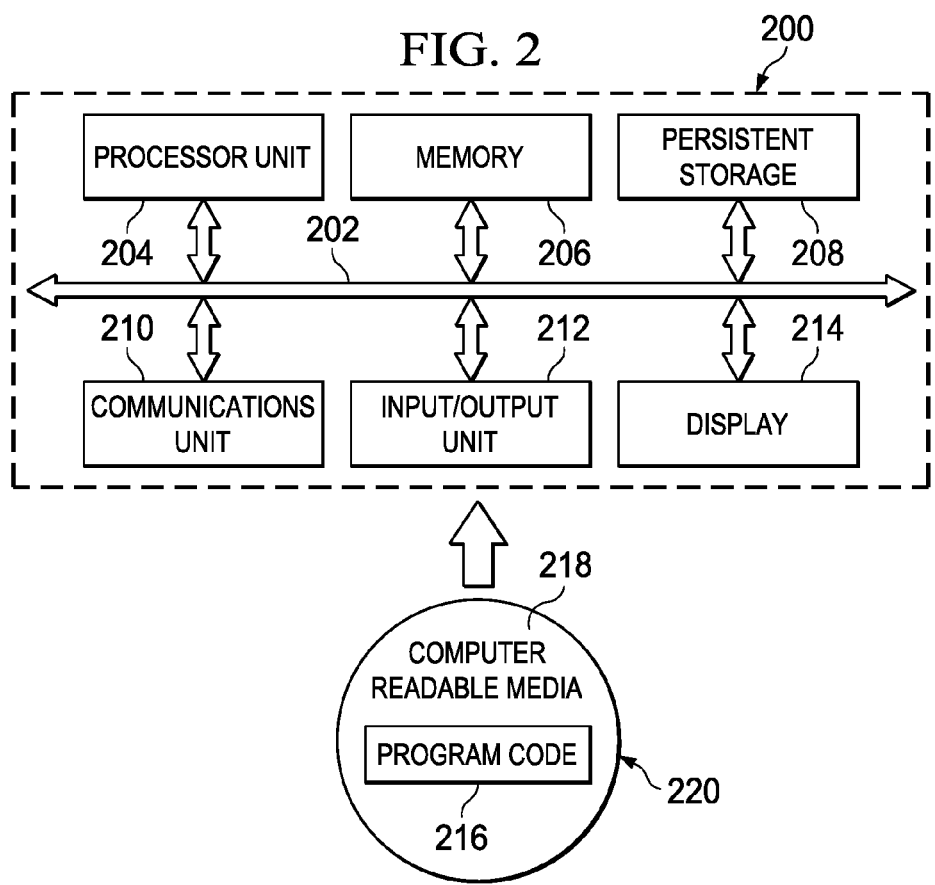
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible cloud-based portal or application executing on a set of one or more machines. End users operate Internet-connectable devices (e.g., desktop computers, notebook computers, Internet-enabled mobile devices, or the like) that are capable of accessing and interacting with the portal or application. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Typically, a cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses.

Virtualization

By way of additional background, virtualization techniques enable the configuration of physical resources. One such virtualization technique is "logical partitioning." Logical partitioning is the ability to make a server run as if it were two or more independent servers. When a server is logically partitioned, the resources on the server are divided into subsets called logical partitions. Software may be installed on a logical partition, and the logical partition runs as an independent logical server with the resources that are allocated to the logical partition. Processors, memory, and input/output (I/O) devices can be assigned to logical partitions. I/O devices include network adapters.

With virtual adapters, logical partitions can be connected with each other without using physical hardware. Operating systems can display, configure, and use virtual adapters just like they can display, configure, and use physical adapters. Depending on the operating environment used by the logical partition, virtual Ethernet adapters, virtual Fiber Channel adapters, virtual Small Computer Serial Interface (SCSI) adapters, and virtual serial adapters for a logical partition can be created and managed. Similarly, the Ethernet adapters are visible in the same way as physical Ethernet adapters. By default, virtual Ethernet Media Access Control (MAC) addresses are created from the locally administered range. Using the default MAC addresses, it is possible that different servers will have virtual Ethernet adapters with the same addresses.

Virtual Ethernet allows logical partitions to communicate with each other without having to assign physical hardware to the logical partitions. Virtual Ethernet adapters can be created on each logical partition and connected to virtual LANs. TCP/IP communications over these virtual LANs is routed through the server firmware. A logical partition can use virtual Ethernet adapters to establish multiple high-speed inter-partition connections within a single managed system. Logical partitions can communicate with each other using TCP/IP over the virtual Ethernet communications ports. Virtual Ethernet adapters are connected to an IEEE 802.1q (VLAN)-style virtual Ethernet switch. Using this switch function, logical partitions can communicate with each other by using virtual Ethernet adapters and assigning VLAN IDs that enable them to share a common logical network. The virtual Ethernet adapters are created and the VLAN ID assignments typically are done using a hardware management console. When configured, the system transmits packets by copying the packet directly from the memory of the sender logical partition to the receive buffers of the receiver logical partition, preferably without any intermediate buffering of the packet. An Ethernet bridge may be configured between the virtual LAN and a physical Ethernet adapter that is owned by a virtual server or a logical partition. The logical partitions on the virtual LAN can communicate with an external Ethernet network through the Ethernet bridge.

Virtualized Network Environments

Figure 3:
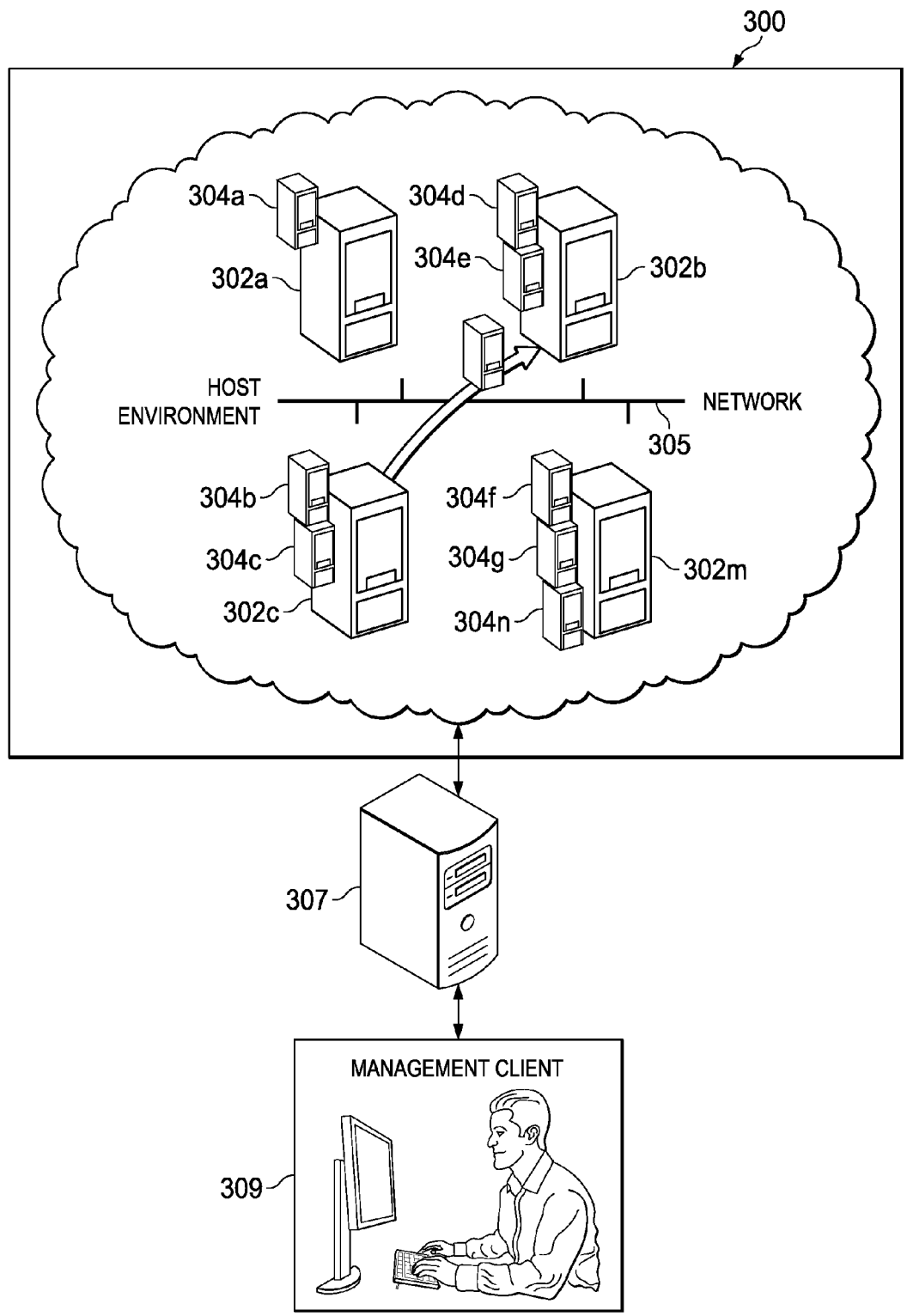
FIG. 3 illustrates an exemplary virtual networking environment.

In FIG. 3, an example virtual machine hosting environment 300 (sometimes referred to herein as a data center or "cloud") is illustrated. This environment comprises host machines (HM) (e.g., servers or like physical machine computing devices) connected via a network 305 and a management server 307. As shown in FIG. 3, physical servers 302a . . . 302m, are each adapted to dynamically provide one or more virtual machines (VM$_1$ . . . VM$_n$) denoted as 304a through 304n, respectively) using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. The management server 307 may be connected to a client console 309, or to a global management system that manages larger-scale infrastructure (if the data center is being managed with other data centers). The management server 307 monitors the infrastructure and automatically manipulates the VM placement as needed, e.g., by moving virtual machines between hosts, suspending/resuming virtual machines, and the like.

Software Defined Networking (SDN)

As noted above, Software Defined Networking (SDN) is a network paradigm that separates each network service from its point of attachment to the network, creating a far more dynamic, flexible, automated, and manageable architecture. Using SDN, administrators can move virtual resources throughout the network, create private virtual networks that meet specific performance and security needs, and use a host of other high-value applications. The key to SDN is an innovative approach to controlling how data flows through a network.

In a traditional network, data flow is controlled by switches and routers. Each switch and router contains several basic elements: a data plane, a control plane, and a management plane. The data plane physically carries data packets from one port to another by following rules that are programmed into the device hardware, and typically plane operates at the speed of the network (wire speed). The control plane contains the logic that the device uses to program the data plane, so packets are forwarded correctly throughout the network. The management plane enables an administrator to log-in to the device and configure it for basic activities. Most devices can be configured locally or through a network management tool. Vendors use control plane software to optimize data flow to achieve high performance and a competitive advantage. The switch-based control plane paradigm, however, gives network administrators little opportunity to increase data flow efficiency across the network as a whole. SDN abstracts flow control from individual devices to the network level. Similar to server virtualization, where virtual machines are de-coupled from the physical server, network-wide virtualization gives administrators the power to define network flows that meet the connectivity requirements of end stations and to address the specific needs of discrete user communities. SDN uses a modular approach that is structured and layered to provide the same functions as a traditional network device, yet in a centralized and highly-available fashion.

As further background, it is known to use a software defined network (SDN) controller to segregate and prioritize SDN-controlled routes in a switch routing table. One goal of a SDN is to allow the network to be programmable via a SDN controller. The SDN controller typically is physically separated from any of the controlled network switches, but is not necessarily located remotely therefrom. One method that allows for programmability of the network may involve the use of the OpenFlow communication protocol. Other applications that may allow for programmability of the network may be used, in addition to or in place of OpenFlow. Other methods that allow for the network to be programmable involve more traditional approaches, such as simple network management protocol (SNMP), network configuration protocol (NetConf), etc. In future versions of OpenFlow, support may be added for programming layer 3 IPv4 and layer 3 IPv6 Forwarding Elements via OpenFlow. Layer 3 forwarding element programming via OpenFlow may add support to program the Layer 3 forwarding table, also referred to as a Forwarding Information Base (FIB). In contrast to the Routing Information Base (RIB), the FIB is optimized for fast longest prefix match lookup of a destination internet protocol (IP) address and may be used for data path forwarding. OpenFlow Layer 3 forwarding element programming may be used by SDN user applications to program the Layer 3 forwarding tables, in some conventional uses.

Figure 4:
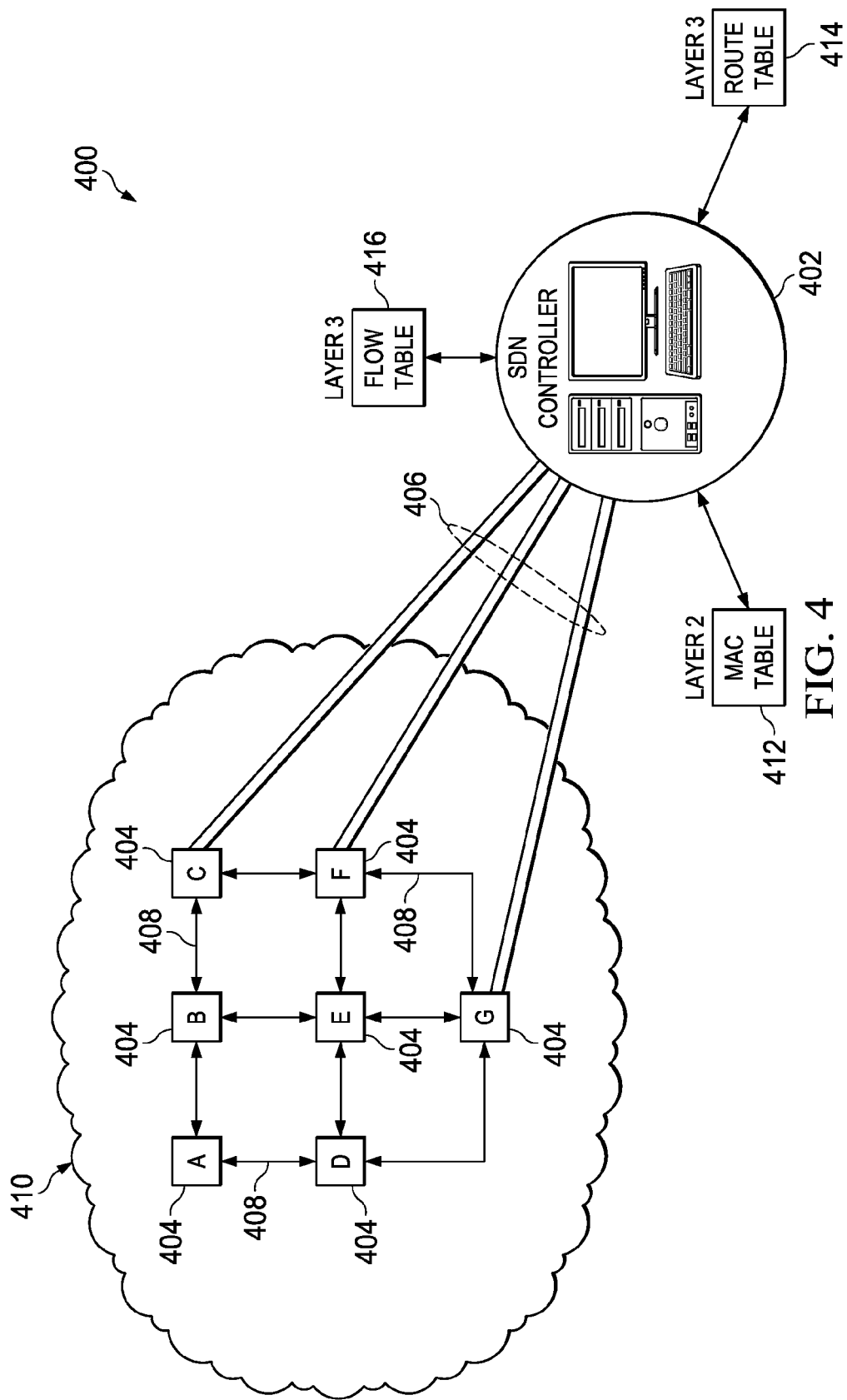
FIG. 4 illustrates an SDN environment managed by an SDN controller.

The SDN controller has logic integrated with and/or executable by a processor, wherein the logic is adapted to determine SDN routes through the network between the one or more devices and each of the plurality of switches, and to send one or more SDN routes to each switch in the network capable of communicating with the SDN controller. FIG. 4 illustrates this known functionality.

In FIG. 4, a system 400 comprises switches A-G 404, with each switch 404 connected in a network 410 via connections 408 of any known type, such as Ethernet (Cat 5, Cat5e, etc.), fiber channel (FC), optical fiber, coaxial cabling, multi-mode fiber, etc. The switches 404 may make use of a media access control (MAC) table 412 and a route table 414 within each switch 404 for choosing transmission routes between devices in the network 410, depending on whether the traffic is Layer 2 or Layer 3. In particular, the MAC table 412 may be used to determine destination addresses for Layer 2 traffic, while the route table 414 may be used to determination routes for delivery of Layer 3 traffic. With a SDN 410, route calculation functionality for each of the switches 404 may be moved from the processors (CPUs) of the switches 404 to a different system (which is not a switch or a router), namely, the SDN controller 402. The SDN controller 402 may perform the route calculations and send the route calculations to the switches 404, but not necessarily the route information. In this manner the SDN moves away from a distributed, to a centralized, mechanism, where the controller 402 learns about the whole network 410 and configures the route tables 414 and MAC tables 412 in a status that ultimately is used to decide which packet is delivered through which route.

Figure 5:
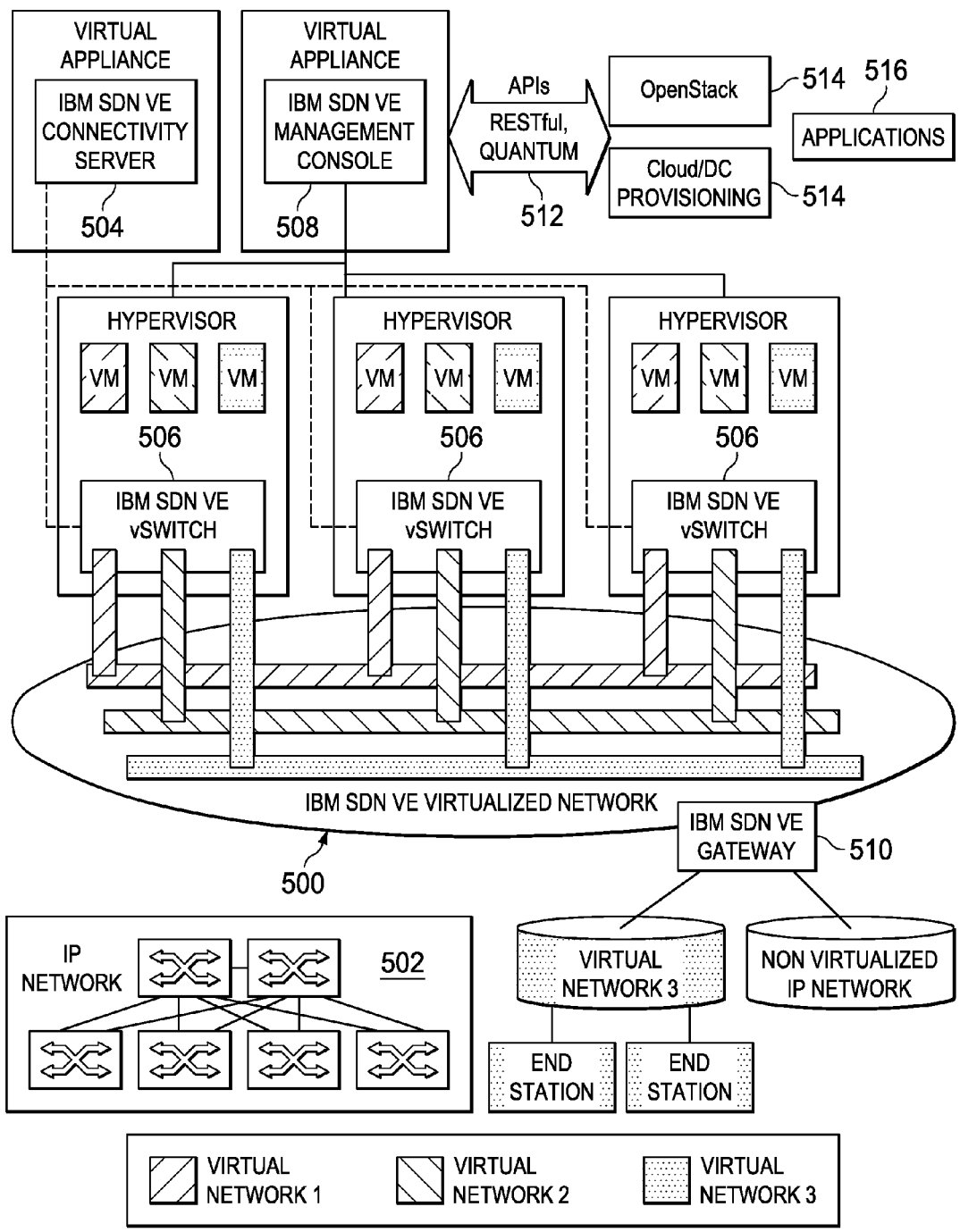
FIG. 5 depict an SDN-based virtual environment (VE) in which the techniques of this disclosure may be implemented.

A representative SDN-based virtual environment (VE) is shown in FIG. 5. This architecture provides an exemplary implementation to support SDN in the context of a virtual network (such as shown in FIG. 3). It provides for a multi-tenant SDN.

The SDN VE virtualized network 500 is built as an overlay on existing IP or OpenFlow network 502. A connectivity server 504 is the control place for the virtual network. It is a logically centralized entity that is responsible for determining forwarding decisions and network policy enforcement in the virtual network. This server corresponds to the SDN controller in FIG. 4. An overlay-enabled vSwitch 506 is the data plane of the virtual network. It is responsible for data traffic from source end station to destination end station. A management console 508 is the management plane. Users can create and manage virtual networks through the management console. One or more overlay gateways 510 are used to connect to non-virtualized end stations and connecting to physical networks. The network virtual solution provides application programming interfaces (APIs) 512 that orchestration tools 514 and applications 516 can use to programmatically access the network. In this example, there are three (3) virtual networks, corresponding to three (3) distinct tenants. A representative commercial implementation of this architecture may be implemented using IBM® SDN VE Virtualized Network.

As illustrated, the above-described architecture comprises a hardware layer (that includes the physical machines and resources), a hypervisor, and individual virtual machines. The virtual machines run on virtual networking technologies, such as VMware ESX/ESXi. An operating system, one or more applications, and other virtual resources, may be associated with a virtual machine. Representative platform technologies are, without limitation, IBM System x® servers with VMware vSphere 4.1 Update 1 and 5.0.

Adding Multi-tenant Awareness to Network Packet Processing Device on SDN

With the above as background, the subject matter of this disclosure is now described. Without limitation, the subject matter may be implemented within or in association with an SDN switch and SDN controller operating within a virtualized network environment, as has been described above.

According to this disclosure, a multi-tenant SDN-based architecture includes a tenant-to-address mapping "service" that is queried to identify a particular tenant to which a packet is associated. An SDN controller associated therewith manages a logical routing system, and there may be one or more packet processing modules (PPMs) or devices (PPDs). As will be described in more detail below, the address translation typically is applied at distinct events, namely: prior to transmission to a packet processing module (PPM), prior to policy deployment to the PPM, and (when the packet is sent to another PPM), subsequent to egress from the PPM. A benefit of this approach is that it works with any networking attributes of any protocol that includes a protocol layer's address parameters (namely, source and destination).

Advantageously, the technique translates arbitrary (or any) network attributes across potentially all the protocols that are present in an Ethernet frame (or packet) to the logical routing system managed by the SDN controller. In this way, protocol elements are dynamically translated to enable logical network (as opposed to) physical routing of traffic to packet processors.

Figure 6:
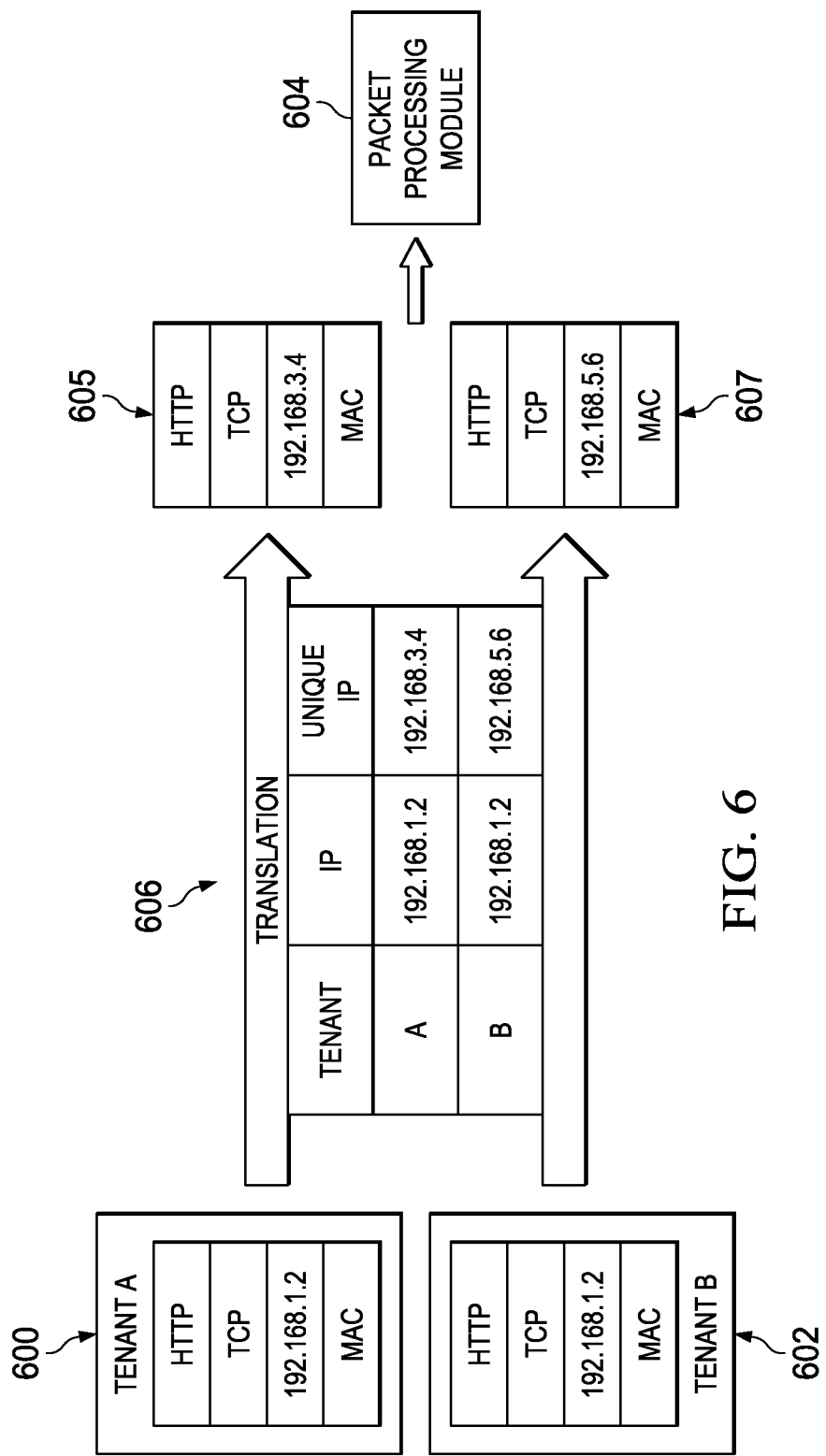
FIG. 6 depicts a multi-tenant packet transmission and address translation operation according to this disclosure.
Figure 7:
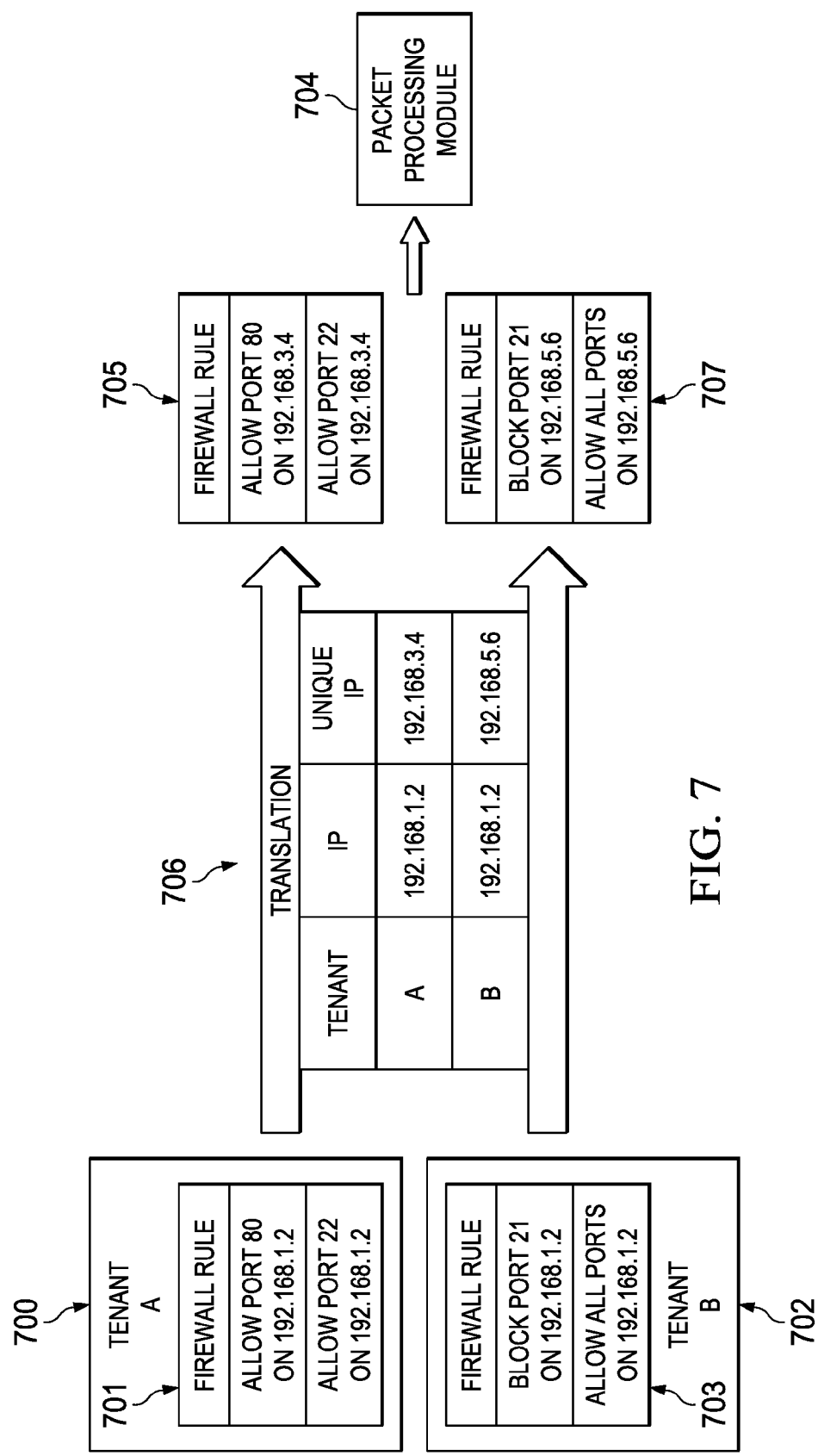
FIG. 7 depicts a multi-tenant packet transmission and address translation, together with a firewall policy translation operation according to this disclosure.

FIG. 6 and FIG. 7 depict several examples of the physical translation of actual data packet address information according to the technique of this disclosure. As will be seen, the approach of this disclosure involves selectively modifying particular protocol address attributes to enable the multi-tenant awareness. Without limitation, the translation may be carried out in a convenient machine, device, appliance, program or process (e.g., a Network Address Translation (NAT) module).

In a first example, as shown in FIG. 6, there are two tenants, Tenant A 600, and Tenant B 602. Tenant A 600 and Tenant B 602 are assumed to be sending packets with the same source IP address (192.168.1.2) to packet processing module 604. The tenant-to-address mapping service 606 is positioned before the packets reach the PPM 604. In this example scenario, the mapping service 606 translates the common IP address as shown so that each packet looks unique to the PPM 604. Thus, Tenant A's packet's IP address gets changed from 192.168.1.2 to 192.168.3.4, while Tenant B's packet's IP address gets changed from 192.168.1.2 to 192.168.5.6. The packets 605 and 607 that result from the translation by the tenant-to-address mapping service 606 are then provided to the PPM 604.

In a second example, as shown in FIG. 7, once again there are two tenants, Tenant A 700, and Tenant B 702. In this scenario, and in addition to sharing the common IP address (192.168.1.2), the tenants also have distinct firewall policies 701 and 703 that both reference that same IP address. Thus, the multi-tenant awareness must address two different network attributes that are present in the flow. In this example, and as depicted, Tenant A's firewall policy 701 allows only port 80 and port 22 traffic on that IP address, while Tenant B's firewall policy 703 allows all ports, excepting port 21 traffic, on that address. Tenant A 700 and Tenant B 702 are assumed to be sending packets with the same source IP address (192.168.1.2) to packet processing module 704. As in FIG. 6, the tenant-to-address mapping service 706 once again is positioned before the packets reach the PPM 704. In this example scenario, the mapping service 706 applies the address translation (as shown in FIG. 6), and creates new firewall rules 705 and 707 that reflect the modified addresses. Thus, and continuing with the example, within Tenant A's new firewall policy 705, the rules now reference the modified IP address (192.168.3.4) assigned by the service, while within Tenant B's new firewall policy 707, the rules now reference the modified IP address (192.168.5.6) assigned by the service.

The above examples are not intended to be limiting. As previously described, the translation provided herein is not limited to any particular networking attributes of a protocol; rather, the translation may be carried out with any network attributes of any protocol that includes a protocol layer's address parameters (source, and destination).

Figure 8:
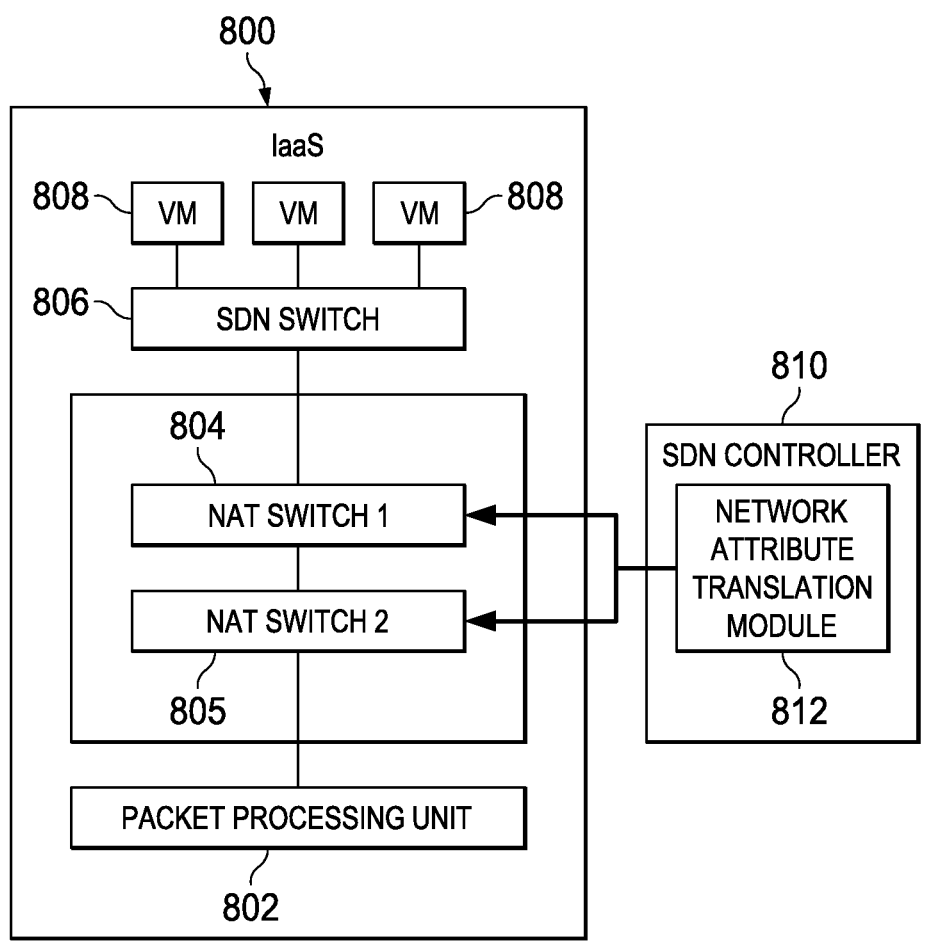
FIG. 8 depicts an embodiment within an IaaS environment in which SDN is provided for virtual networking and in which the technique of this disclosure is carried out.

FIG. 8 illustrates an embodiment in which the technique of this disclosure is implemented, preferably within or in association with an SDN controller, which will be a typical operating environment. In this example, an IaaS environment 800 such as described above comprises a packet processing unit 802, one or more NAT switches 804 and 805, an SDN switch 806, and virtual machines 808. There may be multiple packet processing units (modules or devices). An SDN controller 810 is configured with a network address translation module 812 to provide the tenant-to-address mapping service function of this disclosure. In this environment, wherein the multi-layer SDN switch-based NAT is placed between IaaS-provided switch 806 and the IaaS-provided packet processing unit 802, typically the unit 802 is one of: a switch, a network interface card, a router, a firewall, an intrusion detection and prevention system, a content filter, or any other virtual flow processor.

In one embodiment, the number of layers of multi-layer SDN switch-based NAT is determined by the network administrator, typically based on network settings and network requirements. For example, a two-layer SDN switch-based network attribute translation such as illustrated comprises NAT Switch 1 804 and NAT Switch 2 805. In an alternative embodiment, the number of layers is determined automatically or programmatically. The number of layers may also be pre-configured by default, or via a template.

In this example, which is not intended to be limited, NAT Switch 1 804 is operative to translate packet source attributes, while NAT Switch 2 805 is operative to translate packet destination attributes. These functions may be combined. Typically, as more layer(s) are provided, additional flexibility and efficiency can be achieved. Note that the connection within the multi-layer switch-based NAT is not necessarily always serial; rather, it may be parallel or even web-like complex to serve an entire data center with a large number of tenants. Thus, the configuration depicted in FIG. 8 is not intended to be taken to limit this disclosure.

Preferably, the network attribute translation (NAT) module 812 of this disclosure is installed in the SDN controller 810 as a plug-in bundle, or it is installed along with the SDN controller as additional software. Preferably, the NAT module 812 also is responsible for NAT management and NAT installation. According to this disclosure, it is operative to manage translation mappings (such as shown in FIG. 6) and to install relative SDN rules (such as shown in FIG. 7) onto the one or more SDN NAT switches 804 and 805, e.g., based on their locations.

As noted above, preferably any network attributes may be translated by the NAT module. These network attributes include, without limitation, network (IP) address, port number, MAC address, VLAN attributes, and tunnel identifier (ID). As depicted in FIG. 6, for example, preferably these network attributes are physically translated into unique and public mappings. As used herein, any such network attribute that may be translated according to this technique is sometimes referred to as a protocol element. The NAT module 812 thus is operative to dynamically translate one or more protocol elements to enable logical network (not physical) routing of traffic to packet processors. It operates to translate any networking attributes across all protocols present in the Ethernet frame (or packet) to any logical routing system or configuration managed by the SDN controller 810. In addition, and because the NAT module preferably also works at the policy level, the approach also ensures that tenant-specific policies can be enforced properly in the multi-tenant operating environment.

The NAT module 812 preferably implements a rule table 900 such as shown in FIG. 9. The configuration and data comprising rule table 900 is provided merely for illustrative purposes and should not be taken to limit the scope of this disclosure. The information may be maintained in other types of data structures, such as data arrays, linked lists, relational tables, or the like. Preferably, the rule table 900 conforms to the OpenFlow protocol as necessary.

As can be seen, the rule table includes a number of rows 902, each of which correspond to a particular rule, and a set of columns 904. The columns of the rule table 900 describe a priority of the rule, a rule type, one or more match conditions that trigger the rule, and an action to take if the applicable rule is triggered. The rule table may be pre-configured by an administrator, automatically or programmatically. The rule table may be static or dynamic, as one or more rules may be added to the table, or one or more of the table elements (i.e., priority, type, match condition, or action) may be varied. Typically, the rule table is proactively installed by the NAT module in the SDN controller. The information (or some portion thereof) in the rule table is sometimes referred to herein as a "data set."

With continued reference to FIG. 8, the following provides a practical example of one operating scenario using the rule table shown in FIG. 9. Assume that one of the virtual machines 808 is associated with Tenant A with network address 10.0.0.1 sends a packet to an external network (not shown). Upon receiving such packet, the NAT Switch 1 804 will try to find a match in the rule table 900. After looking up into the table, assume that the NAT Switch 1 804 finds a source IP address (SRC-IP) match; it then carries out the action (the translation) according to the table values, in this case translating the IP address from 10.0.0.1 to 192.168.122.101. Following the translation, the switch 804 then outputs the packet to a next hop. This particular example is tantamount to traditional network address translation, but a skilled person will appreciate that using the values in the table, NAT Switch 1 can translate any network attribute or combination of network attributes, to some other network attribute, or to some other combination. Thus, without limitation, the NAT switch 1 can translate IP, port, MAC, VLAN, and even multi-attribute protocol elements. In like manner, NAT switch 2 uses the information in the table 900 to translate one or more destination attributes.

Typically, and without limitation, the reverse-* entries in the table are leveraged in the scenario where the packet processing unit 802 is a packet inspection device, such as an intrusion detection and prevention system. In such a scenario, the packets are first delivered to the packet inspection unit for processing, but then are sent back to their source without any modification. For example, with reverse-* entries, the source network address 10.0.0.1 is translated to 192.168.122.101 for tenant-aware packet inspection, but then translated back to 10.0.0.1 and outputted to the original switch.

As described above, the protocol element translation is applied at one or more of the following events/interfaces: (1) prior to transmission to the PPM (e.g., FIG. 6); (2) prior to policy deployment to the PPM (e.g., FIG. 7); and (3) subsequent to egress from the PPM when the frame or packet is sent to another PPM, as in the case of chained services.

Thus, instead of encapsulating traffic to identify the tenant to which traffic is associated, this disclosure describes a model by which network addresses (namely, IP addresses) are changed in route. In a preferred embodiment, and instead of binding tenant information to the outer overlay protocol, the described technique employs a tenant-to-IP address mapping service that is queried to identify the particular tenant to which a packet is associated. This service (and the tenant information it contains) provides significant performance advantages as distinguished from the conventional overlay protocol or tunneling. Indeed, with the subject technique, a particular processor need only consult the service at the beginning of a network flow. That said, the switches that enable the overlay, however, still must encapsulate each and every packet, and the packet processing devices (PPDs) or units still must de-encapsulate each and every packet to do its work. Even accounting for this overhead, the technique herein provides for improved performance as compared to the overlay protocol and, in particular, by using SDN multi-layer switches. The approach also is much more flexible than conventional network address and port translation (NPAT) because it can translate all network and address attributes associated with a particular packet.

Preferably, and has been described, SDN technology is used to implement an efficient NAT module in the environment. The above-described technique also provides for an innovative way to leverage multi-layer SDN switching to greatly reduce the rule complexity on SDN switches. For instance, and if it required to translate both source and destination IP addresses, the controller needs to push out $O(N^2)$ rules to the SDN switch when there is only one layer. When two layers of SDN switches are used, however, the controller only needs to push $O(N)$ rules to the first switch and $O(N)$ rules to the second switch. In the latter (multi-layer switch scenario), the overall complexity thus is reduced from $O(N^2)$ to $O(N)$.

This combination of multi-level NAT evaluation and deployment within an SDN-compliant data plane (preferably with SDN-based provisioning across the control plane), provides significant performance benefits as compared to overlay protocol or tunneling-based solutions. As has been described, the approach can work with any networking attributes of any protocol that includes a protocol layer's address parameters. The technique translates arbitrary (or any) network attributes across all the protocols that may be present in a packet or frame to a logical routing system (preferably multi-layer) managed by the SDN controller. Using the rule table, protocol elements are translated dynamically (when in-route) to enable logical network routing of the traffic to packet processing units. This approach thus uses physical translation of the actual data packet address information to achieve the performance enhancements in the manner described.

A further advantage of this approach as compared with traditional network address translation solutions that require a dedicated server, the technique herein needs only the accessibility to an SDN controller; thus, it consumes far less resources but operates far more efficiently and flexibly.

As is well-known, one benefit of tenant segregation is the ability to insert virtual flow processors (i.e., firewalls, intrusion detection, and content analyzers, or other PPDs) into tenant-specific network flows. By providing a tenant-to-network address mapping service according to this disclosure, the SDN controller can communicate to each switch in the network the both the packets and the policy required by the dedicated PPDs. In this way, an SDN can effectively enforce and monitor a switch configuration to assure the appropriate PPD is assigned to the appropriate tenants. The techniques described herein therefore enrich existing SDN controllers, their vSwitch(s), and the resulting packet flow in the environment to achieve multi-tenancy with otherwise non-tenant aware SDN infrastructure.

The approach as described herein may be applied to both physical and virtual SDN switches. The technique may apply to all types of network services, including services that are chained. Further, the technique is independent of any protocol, thereby to reduce overhead that might otherwise be incurred to introduce a client to the network environment.

Preferably, the SDN controller is implemented as programmable logic implemented in a processor. This programmable logic uses the tenant-to-network address mapping data, and the physical translation of the actual data packet address information as described, to maintain the multi-tenant awareness in the SDN.

As has been described, the functionality described above may be implemented as a standalone approach, e.g., a software-based function executed by a processor, or it may be available as a managed service (including as a web service via a SOAP/XML interface). A preferred approach implementation is as an SDN software plug-in. The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the SDN controller is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute or virtual networking management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The reference to "packet processing unit" or "device" or "module" should not be taken to limit the disclosed subject matter to any particular type or source of packet processing or inspection technology or software. The term may refer to any such functionality, which need not be a stand-alone product or set of code.

The techniques herein provide for improvements to technology or technical field, namely, virtual networking environments, as well as improvements to SDN switches and SDN controllers themselves.

The terms packet processing devices, modules and units are synonymous for purposes of this disclosure.

Having described our invention, what we now claim is as follows.

The invention claimed is:

1. A method to add multi-tenant awareness to a set of one or more packet processing devices in a multi-tenant Software Defined Network (SDN) having a controller, comprising:
   maintaining a data set that, for each of one or more tenants, associates one or more network protocol address attributes with an Internet Protocol (IP) address unique to the tenant, wherein at least a first tenant also has associated therewith a security policy;
   associating the data set with a translation layer configured for multi-layer SDN switching;
   as a packet associated with the first tenant and being routed to a given packet processing device (PPD) traverses the translation layer, translating one or more network protocol address attributes according to the data set; and
   adjusting the first tenant's security policy to include the translated one or more network protocol address attributes such that, from a perspective of the given PPD, the packet and the adjusted security policy are then uniquely associated with the first tenant;
   wherein the translation layer is a network address translation layer having two or more layers.

2. The method as described in claim 1 wherein a first layer of the network address translation layer translates network protocol address source attributes, and a second layer of the network address translation layer translates network protocol address destination attributes.

3. The method as described in claim 1 wherein the one or more network protocol address attributes are any networking attribute of any networking protocol that includes source and destination address parameters.

4. The method as described in claim 1 wherein, with respect to a second packet that originates from the given packet processing device and that is destined for a second packet processing device, translating one or more network protocol address attributes in the second packet using the data set to enable logical routing of the second packet to the second packet processing device.

5. The method as described in claim 1 wherein the translation layer is positioned between a network infrastructure and the one or more packet processing devices.

6. The method as described in claim 5 wherein the network infrastructure comprises a virtual environment.

7. The method as described in claim 1 wherein a second tenant also has associated therewith a security policy, the first and second tenant security policies being distinct from one another and sharing a same source IP address prior to multi-tenant awareness being added, and further including adjusting the second tenant's security policy, wherein the adjusted security policy associated with the first tenant includes a first new source IP address, and an adjusted security policy associated with the second tenant includes a second new source IP address distinct from the first new source IP address.

8. Apparatus associated with an SDN controller, comprising:
   a processor;
   computer memory holding computer program instructions executed by the processor to add multi-tenant awareness to a set of one or more packet processing devices in a multi-tenant Software Defined Network (SDN) by:
      maintaining a data set that, for each of one or more tenants, associates one or more network protocol address attributes with an Internet Protocol (IP) address unique to the tenant, wherein at least a first tenant also has associated therewith a security policy;
      associating the data set with a translation layer configured for multi-layer SDN switching;
      as a packet associated with the first tenant and being routed to a given packet processing device (PPD) traverses the translation layer, translating one or more network protocol address attributes according to the data set; and
      adjusting the first tenant's security policy to include the translated one or more network protocol address attributes such that, from a perspective of the given PPD, the packet and the adjusted security policy are then uniquely associated with the first tenant;
      wherein the translation layer is a network address translation layer having two or more layers.

9. The apparatus as described in claim 8 wherein a first layer of the network address translation layer translates network protocol address source attributes, and a second layer of the network address translation layer translates network protocol address destination attributes.

10. The apparatus as described in claim 8 wherein the one or more network protocol address attributes are any networking attribute of any networking protocol that includes source and destination address parameters.

11. The apparatus as described in claim 8 wherein, with respect to a second packet that originates from the given packet processing device and that is destined for a second packet processing device, one or more network protocol address attributes in the second packet are translated using the data set to enable logical routing of the second packet to the second packet processing device.

12. The apparatus as described in claim 8 wherein the translation layer is positioned between a network infrastructure and the one or more packet processing devices.

13. The apparatus as described in claim 12 wherein the network infrastructure comprises a virtual environment.

14. The apparatus as described in claim 8 wherein a second tenant also has associated therewith a security policy, the first and second tenant security policies being distinct from one another and sharing a same source IP address prior to multi-tenant awareness being added, and further including adjusting the second tenant's security policy, wherein the adjusted security policy associated with the first tenant includes a first new source IP address, and an adjusted security policy associated with the second tenant includes a second new source IP address distinct from the first new source IP address.

15. A computer program product in a non-transitory computer readable medium for use in a data processing system, the computer program product holding computer program instructions which, when executed by the data processing system, add multi-tenant awareness to a set of one or more packet processing devices in a multi-tenant Software Defined Network (SDN) by:
   maintaining a data set that, for each of one or more tenants, associates one or more network protocol address attributes with an Internet Protocol (IP) address unique to the tenant, wherein at least a first tenant also has associated therewith a security policy;
   associating the data set with a translation layer configured for multi-layer SDN switching;
   as a packet associated with the first tenant and being routed to a given packet processing device (PPD) traverses the translation layer, translating one or more network protocol address attributes according to the data set; and
   adjusting the first tenant's security policy to include the translated one or more network protocol address attributes such that, from a perspective of the given PPD, the packet and the adjusted security policy are then uniquely associated with the first tenant;
   wherein the translation layer is a network address translation layer having two or more layers.

16. The computer program product as described in claim 15 wherein a first layer of the network address translation layer translates network protocol address source attributes, and a second layer of the network address translation layer translates network protocol address destination attributes.

17. The computer program product as described in claim 15 wherein the one or more network protocol address attributes are any networking attribute of any networking protocol that includes source and destination address parameters.

18. The computer program product as described in claim 15 wherein, with respect to a second packet that originates from the given packet processing device and that is destined for a second packet processing device, one or more network protocol address attributes in the second packet are translated using the data set to enable logical routing of the second packet to the second packet processing device.

19. The computer program product as described in claim 15 wherein a second tenant also has associated therewith a security policy, the first and second tenant security policies being distinct from one another and sharing a same source IP address prior to multi-tenant awareness being added, and further including adjusting the second tenant's security policy, wherein the adjusted security policy associated with the first tenant includes a first new source IP address, and an adjusted security policy associated with the second tenant includes a second new source IP address distinct from the first new source IP address.

20. A networking system having a Software Defined Networking (SDN) controller that executes in a hardware processor, comprising:

a data store that stores a data set that, for each of one or more tenants, associates one or more network protocol address attributes with an Internet Protocol (IP) address unique to the tenant, wherein at least a first tenant also has associated therewith a security policy; and a plug-in to the SDN controller, the plug-in executing in the hardware processor and being operative as data packets associated with the first tenant traverse an associated multi-layer SDN switching data plane to translate one or more network protocol address attributes according to the data set, and to adjust the first tenant's security policy to include the translated one or more network protocol address attributes such that the packets and the adjusted security policy are then uniquely associated with the first tenant;

wherein a first layer of the multi-layer SDN switching data plane translates network protocol address source attributes, and a second layer of the multi-layer SDN switching data plane translates network protocol address destination attributes.

\* \* \* \* \*